Patented Aug. 14, 1934

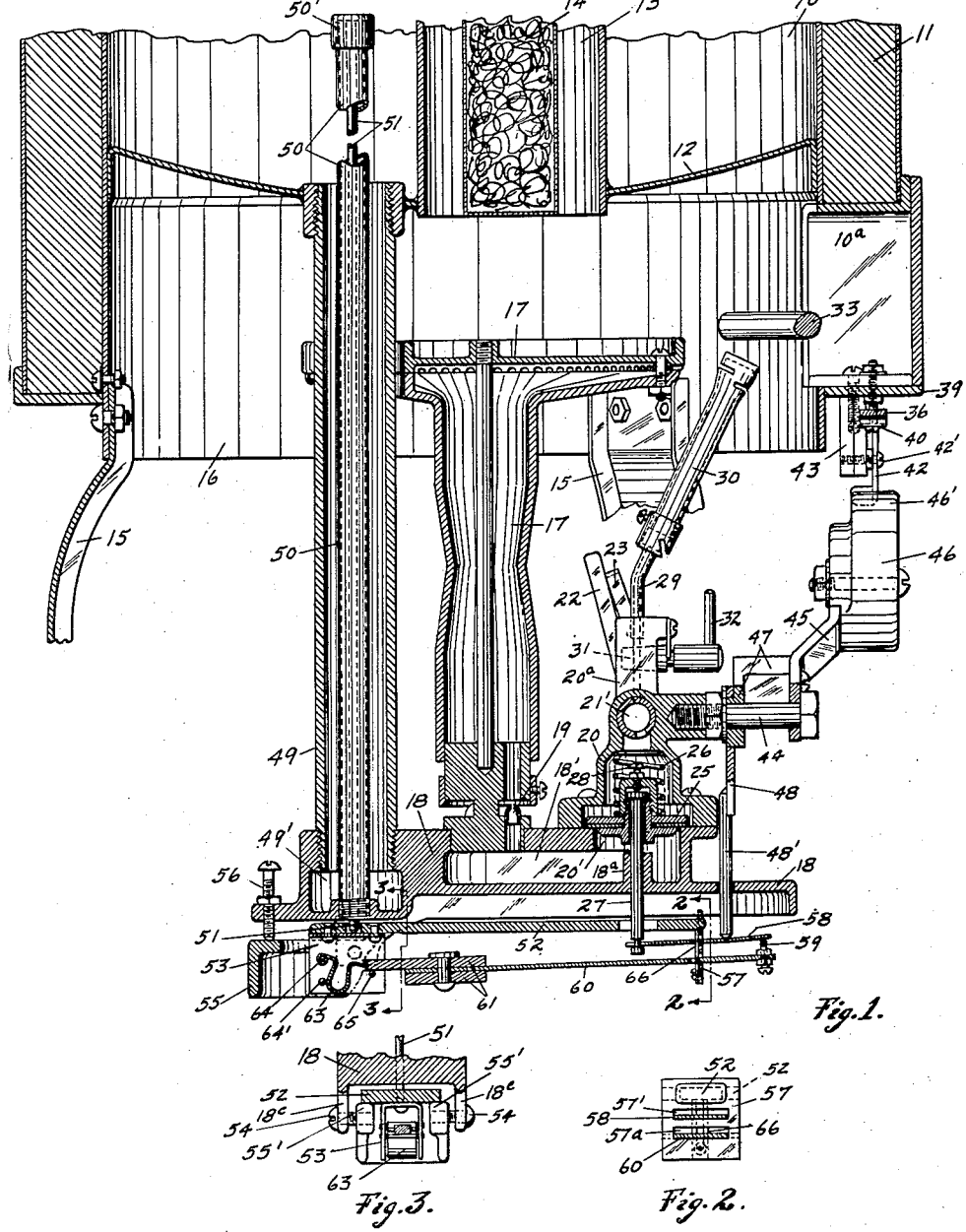

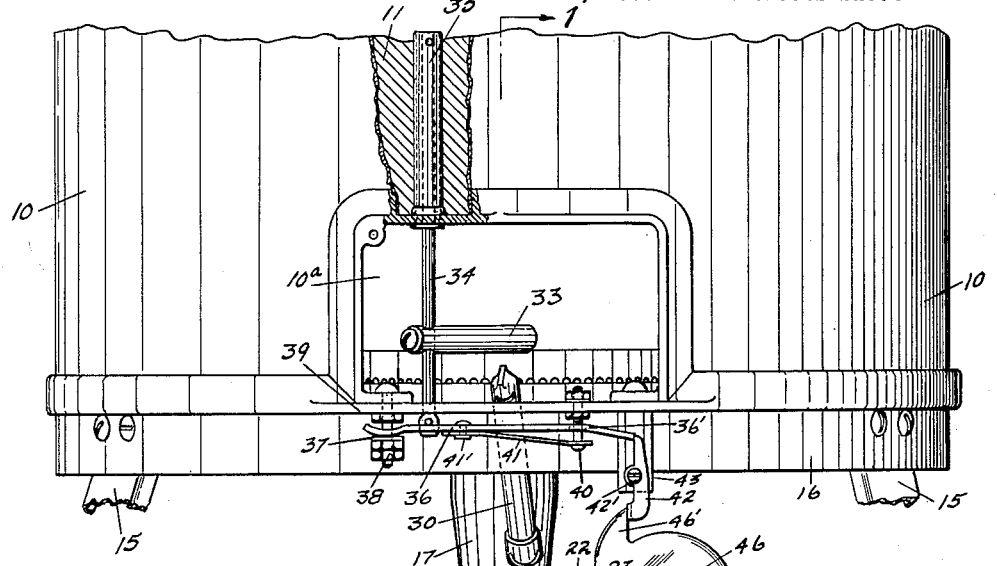

1,969,921

UNITED STATES PATENT OFFICE 1,969,921

AUTOMATIC CONTROL MECHANISM FOR WATER HEATERS

Julius Brombacher, Los Angeles, Calif.

Application October 29, 1930, Serial No. 491,900

4 Claims. (Cl. 158—117.1)

My invention relates to improvements in automatic water heaters, and more particularly in the mechanism designed to automatically control the supply of gas or other heating medium to the tank, and it has among its salient objects to provide in combination with a tank or reservoir and heating means therefor, means controlled by heat for automatically cutting off the heating medium supply to the main heater and also to a secondary heater controlling the main heater, whereby when said secondary heater is off, said mechanism operates to automatically cut off the supply of heating medium to both; to provide in a mechanism having gas for heating and including a main supply and a pilot, means for automatically cutting off the supply of gas to the pilot and at the same time causing the main control for gas supply to be closed, thus making for safety when the pilot supply is cut off temporarily or the pilot light is caused to go out for any reason; to provide an improved automatically operated lever mechanism for control of the main supply and the pilot supply simultaneously when the pilot light goes out; and, in general, to provide an improved mechanism for making certain the automatic cutoff of the heating medium when, for any reason, the pilot or control supply is rendered inoperative.

In order to explain my invention, I have illustrated one practical embodiment thereof on the accompanying two sheets of drawings, said embodiment being in a form using gas as the heating medium. In the drawings—

Figure 1 is a vertical sectional view on line 1—1 of Fig. 5, through the lower end of a water reservoir and through a part of the mechanism embodying my invention;

Figures 2 and 3 are detail sectional views taken from Fig. 1, at lines 2—2, and 3—3, respectively;

Figure 4 is a perspective view of a yoke member;

Figure 5 is a side elevation of the lower end of said reservoir and said mechanism from the right hand side as shown in Fig. 1; Fig. 5ᵃ is an edge view of parts to the right in Fig. 5;

Fig. 6 is an enlarged sectional view through the main lever mechanism which controls the main supply of gas to the main burner; and Figure 7 is a top plan view of the lowermost lever in Fig. 6, through its supporting stirrup.

Referring now in detail to the drawings, the water tank or reservoir is designated 10, with the outside insulation 11, the bottom 12, a central flue 13, and a central insulated core 14. The usual supporting legs 15 and the skirt 16 are shown.

A main heater or burner 17, is connected with a main casting 18, having therein a supply chamber or passage 18' with orifices 19 leading up into the burner in the usual manner, said supply chamber 18' communicating with a valve casing 20, connected with the main supply connection 21, with valve 21' therein, with an operating handle or lever 22, for manually turning said valve to open the main supply of gas to the burner. A stop finger 23 is adjustably mounted near said lever 22 for regulating the distance said valve can be opened for the main supply. This finger is held in place by means of a screw 24, in the side of the valve case 20.

A valve 25 is seated within the valve case 20 and seats over the outlet 20' therefrom to the chamber 18'. Said valve is normally seated by a coiled spring 26, and said valve is loosely supported upon the upper end of a rod 27, with an adjustment screw 28, bearing at its inner end upon the cap end of said rod 27, as clearly shown in Fig. 1. Said rod 27 moves through a guiding boss 18ᵃ, formed in the casting 18, within the chamber 18'. Said main valve 25, therefore, is free to tilt sufficiently to make a perfect seating.

The valve case 20 has an extension 20ᵃ, into which is connected a flow pipe 29, into a pilot burner 30, and with a valve 31 for controlling the supply of gas from the valve case 20 to said flow pipe 29, said valve 31 having an operating handle 32. The pilot burner 30, it will be seen is supported adjacent the main burner 17, for igniting it in the usual manner.

Also mounted near said pilot burner 30, to be heated thereby, is a heat conveying member 33, adjustably secured to a copper rod 34, extended up into an invar member 35, imbedded in the insulating 11 around the outside of the tank 10, as seen in Fig. 5. The lower end of this copper rod 34 is connected with a lever 36, one end of which is seated upon a washer 37, supported by means of bolt and nuts 38, in the flange 39, below the door opening 10ᵃ into the skirt. Said lever 36 at its other end has an opening at 36' through which is a guiding screw 40, anchored to said flange 39, and extended through the end of said lever 36. Said lever is provided on its underside with a leaf spring 41, secured at 41' to said lever and at its other end bearing down upon the head of the screw 40, as clearly shown. Said spring 41 normally and yieldingly pressing the end of said lever 36 upwardly to release a swinging trip dog 42, supported at 42' upon a depending member 43.

Screwed into the side of the valve casing 20,

Fig. 1, is a supporting screw or bolt 44, upon which is pivotally supported an arm 45, having at its upper end a weight 46, having a projecting portion 46' adapted to catch upon the lower end of the swinging trip dog 42, as clearly seen in Figs. 1 and 5. Said arm 45, has an offset extension 47, turning on said bolt 44, with its end extended as at 47' and provided with a laterally projecting pin at 47ª, as seen in detail Fig. 5ª, said pin 47ª being in position as said weight 46 swings downwardly, as indicated by the curved line, to engage and move to closed position the handle 32 on the pivot valve 31. Said extension 47, of said swinging lever, is provided around said pivot bolt 44, with an eccentrically positioned boss 47ᶜ, around which is suspended a yoke 48 having a pressure pin or rod extension 48', extending down through the main casting 18, for a purpose hereinafter referred to.

Screwed into the main casting 18, near the main burner 17, is a tube 49, connected at its upper end to the bottom 12 of the tank or reservoir 10, there being a chamber 49' in the main casting 18 with which said tube communicates at its lower end, its upper end being in communication with the interior of the tank 10. Within said tube 49 is mounted a copper tube 50, screwed into the bottom of the chamber 49' in the main casting 18 at its lower end and at its upper end provided with a closure cap and extended up into the tank or reservoir, said tube having therein an invar rod 51, bearing at its upper end against the cap 50' and at its lower end extended through the tube 50 and bearing upon a lever member 52, by being inserted through a hole 52' therein and bearing upon the top of an inverted loop member 53, riveted to the underside of said lever member 52.

Pivotally held between two downwardly depending side portions 18ᶜ, 18ᶜ, by means of screws 54, 54, is a yoke member 55, shown in perspective in Fig. 4, having the two fulcrum toes 55', 55', bearing against the under side of the lever 52 and upon which said lever 52, rocks. The movement of the rear portion of said yoke 55 is limited by an adjustment screw 56, in a part of the main casting 18, as clearly seen. The forward end of said lever 52, carries a depending stirrup 57, Fig. 2, with two transverse openings 57' and 57ª, therein. Extended through the opening 57' is a short rocker member 58 of flat spring material, secured at one end to the valve pin 27, and at its opposite end resting upon the end of an adjustment screw 59, extended up through a flat spring lever member 60, also extended through said stirrup, in the opening 57ª, and provided at its other end with a weight 61, the upper part of which is extended and provided in its edge with a V-groove 62, to receive the end of a pivoted toggle spring 63. Said toggle spring 63 is pivotally mounted at 64 between the sides of the inverted loop member 53, with a cross pin 64' to prevent the spring from becoming disengaged from the notch 62 in the weight 61, and with a stop pin 65 to limit the down movement of the end of the lever 60, and the weighted end 61 thereof. Its upward movement is limited by the top of the loop member 53, as indicated in the light broken line position, Fig. 6. This toggle spring permits a quick yielding movement of the end of said lever from its lower to its up position, as will be understood from the showing made. As a means for holding the short lever or member 58, and the lever 60 properly positioned in the depending stirrup 57, a strip 66 is inserted through said members 58 and 60 at the stirrup and is secured to said stirrup, as by means of short screws 67. The lever system, including levers or members 52, 60 and 58, may be referred to as primary lever, secondary lever, and intermediate lever, respectively, and their interconnection is rendered inoperative by the release of the member 48, whereby the main valve 25 cannot be opened through said levers.

The operation of this mechanism may be briefly described as follows:

Assuming that the gas supply is connected at 21 to the main valve 21' and that the pilot valve 31 is open, with the handle 32 turned up, as shown in Figs. 1 and 2, and the pilot light is going, also that the weight 46 is in its raised position, as shown, held by the trip dog 42. This weighted lever operates through the eccentric 47ᶜ and the member 48' to exert pressure upon the spring rocker member 58, and through the stirrup 57 and the movable end of the lever 52, to bear down on the valve rod 27, and hold the valve 25, controlling the main flow of gas from the case 20 to the chamber 18' and to the main burner 17, and thus shutting it off, when said valve is closed as seen in Fig. 1. We also assume that the tank is full of hot water.

The pilot valve being open and the pilot lighted, operates through the thermostat elements 33, 34, and 35, to hold the tripping lever 36 down in the position shown in Fig. 5. Should the pilot light be blown out or go out from any reason and the member 33 cool off and the copper rod 34 contract, said tripping lever 36 would be raised thereby sufficiently to release the trip dog 42, and the weight 46 would be released to swing downwardly, as indicated by the curved broken line, while its extension 47' and pin 47ª would engage the pilot valve handle 32 and swing it to closed position, at the same time, through the eccentric connection 47ᶜ with the member 48, would lift said member 48 and 48' and release the pressure upon the spring member 58, leaving the same loose in the stirrup 57, and also leaving the stirrup 57 and the end of the lever 60 loose, so that the valve 25 cannot be opened until the weight is again raised as before. Thus, if the pilot light goes out, instead of gas escaping until discovered, the pilot valve is closed, and at the same time, a connection to the main supply valve is rendered inoperative and the main supply valve is held closed by its coiled spring 26, and the regular thermostatic control is also rendered inoperative until the pilot valve is opened and the pilot again lighted, and the eccentric tension member 48 again depressed.

The main thermostatic control is in the tube 50 and the invar rod 51 and this operates when the temperature of the water falls to open the main valve 25 and light or start the burner 17. This is accomplished in the following manner. As the water cools, the copper tube 50 shrinks or contracts and pulls down on the rod 51, thereby depressing the end of the lever 52, which is fulcrumed on the fulcrum ends 55', 55', of the yoke 55, which raises the free end of said lever 52, together with the stirrup 57 and the end of the lever 60, causing the weighted end of said lever 60 and 61 to rise sufficiently to cause the toggle spring 63 to act to move said lever 60 to the position indicated by the light broken lines. It will be remembered that the rocker member 58 is of spring material, as is also the lever 60 and there is gradually built up that resiliency which causes said levers to move into the position indicated and this rocks the member 58 to the position shown in its light broken lines, which operates the rod 27 and lifts the valve 25. Thus by the depressing of the lever 52 by the invar rod 51 on the opposite side of the fulcrums 55', 55', the other end of said lever is raised, lifting the stirrup, flexing the members 58 and 60 until they cause the weighted end of the lever 60 to flip to its raised position and this rocks the member 58 to operate or open the valve. The downward movement of the outer end of the lever 60, relieves the lever or member 58 of the pressure from the rod 48', thus permitting the stirrup to move said member 58 and cause its free or valve end to raise said valve rod 27 and open the main valve and open the supply of gas to the burner through the chamber 18'. When the outer end of the lever 60, and the bearing screw 59 is thus moved down, the lever 58 is rocked to its broken line position, which opens the valve 25, through the valve rod 27. To lift the eccentric member 48, so relieves the member 58, and the stirrup 57, that they are all loose and will not function, and it is impossible for the regular thermostatic means to operate through the lever 52 to open said main valve, and the mechanism is rendered inoperative until the weighted lever is manually raised and said eccentric tension member 48 again depressed. The pilot is then again lighted and the mechanism is ready for its regular automatic operation, but the going out of the pilot light causes the entire control mechanism to be made inoperative, with the main valve held closed by its spring 26.

Another novel feature in connection with my improved control system is the lever connection which acts to forcibly seat the main valve which controls the main gas supply in addition to the spring 25 which normally seats said valve. This valve 25 has the valve stem or rod 27. With the lower end of this valve rod 27, the intermediate lever or member 58 is connected, and it will be seen that when the weighted lever 60 is down in the full line position in Fig. 6, the bearing screw 59 in the end of said lever 60 is pressing upwardly on the outer end of said intermediate lever 58, which fulcrums on the lower end of the rod 48' with the result that the other end of said intermediate lever 58 is forced downwardly and bears down on the valve rod 27, causing said valve to seat more firmly. This action also bears slightly on the stirrup 57 and the end of the primary lever 52, thus taking up any looseness which may exist in these parts. An important feature also is the fact that these levers or members are made of flexible material and the flexibility of said members compensates for any possible differences in movements, thus making for perfect action and perfect automatic control.

Thus I have provided an improved means for automatically controlling the flow of a heating medium to a main burner and a pilot or secondary burner, operating when the pilot or secondary burner is off to automatically cut off the flow passage to said pilot burner and rendering the main valve inoperative, and while I have only shown and described one mechanism for accomplishing these various results, I am aware that many changes can be made in the construction and arrangement shown without departing from the spirit of the invention, and I do not, therefore, limit the invention to these details, except as I may be limited by the hereto appended claims.

I claim:

1. In a heating system, in combination with a burner and pilot burner therefor having separate fuel supplies, of a main valve normally held closed in the fuel supply to said first burner, a valve controlling the fuel supply to said pilot burner, a weight supported to be released and provided with means for closing said valve in the fuel supply to said pilot burner, thermostatic means responsive when the pilot burner is extinguished for automatically releasing said weight, thermostatic means for automatically opening said main valve to supply fuel to the burner, and means moved by said weight adapted to render the connection from said last thermostatic means to said main valve inoperative.

2. In a heating system, the combination of a primary burner and a secondary burner, separate fuel supplies for said burners, means including a self-closing valve and a thermostat for actuating the same for controlling the flow of fuel to the primary burner, gravity actuated means for simultaneously rendering said first mentioned means inoperative to open said valve and to cut off the flow of fuel to said secondary burner, and a thermostatic means operable in response to the extinguishment of the secondary burner for releasing said gravity actuated means.

3. In a heating system, the combination of a main burner and a pilot burner for lighting said main burner, separate fuel supplies and independent valves for controlling the flow of fuel to said burners, the main burner valve being self-closing, means including a thermostat for automatically opening the main burner valve to permit the passage of fuel to the main burner, gravity actuated means for simultaneously rendering said first mentioned means inoperative to open said valve and to cut off the flow of fuel to said pilot burner, and the thermostatic means operable in response to the extinguishment of the pilot burner for releasing said gravity actuated means.

4. In a heater, a burner, a pilot burner, fuel supply pipes for each burner, a valve in each of said supply pipes, a weight releasably supported and operable when released to close the valve in the pipe to said pilot burner, a first thermostatic means operable in response to the extinguishment of said pilot burner to release said weight, a second thermostatic means operable to open the valve in the supply pipe to the main burner, and including a plurality of interconnected levers interposed between said thermostat and said main burner valve, and means coacting with said weight and functioning to hold said levers in operable connection with said second thermostat and said main burner valve only when said weight is supported, whereby the release of said weight operates to disable said levers and render them inoperable until manually reset.

JULIUS BROMBACHER.